(12) United States Patent
Dossche et al.

(10) Patent No.: US 12,129,665 B2
(45) Date of Patent: *Oct. 29, 2024

(54) ENGINEERED WATERPROOF PLASTIC COMPOSITE FLOORING AND WALL COVERING PLANKS

(71) Applicant: Shaw Industries Group, Inc., Dalton, GA (US)

(72) Inventors: Piet V. Dossche, Rocky Face, GA (US); Philippe Erramuzpe, Augusta, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,188

(22) Filed: Jul. 27, 2023

(65) Prior Publication Data

US 2023/0366214 A1 Nov. 16, 2023

Related U.S. Application Data

(63) Continuation of application No. 17/947,475, filed on Sep. 19, 2022, now Pat. No. 11,753,832, which is a
(Continued)

(51) Int. Cl.
*E04F 15/00* (2006.01)
*B32B 3/02* (2006.01)
(Continued)

(52) U.S. Cl.
CPC .............. *E04F 15/107* (2013.01); *B32B 3/02* (2013.01); *B32B 3/06* (2013.01); *B32B 3/26* (2013.01);
(Continued)

(58) Field of Classification Search
CPC . E04C 2/38; E04C 2/243; E04C 2/246; B32B 21/14; B32B 23/04; B32B 21/12; B32B 21/08; B32B 23/08; E04F 15/02033; E04F 15/02038; E04F 15/107; E04F 15/102; E04F 2201/042; E04F 2201/0107; E04F 2201/03; E04F 2201/0552; E04F 2201/023; E04F 2201/0535; E04F 2201/0146; E04F 2201/043;
(Continued)

(56) References Cited

U.S. PATENT DOCUMENTS 3,837,634 A 9/1974 Cobb
3,908,725 A 9/1975 Koch
(Continued)

FOREIGN PATENT DOCUMENTS

BE 1019331 6/2012
CA 2795411 11/2011
(Continued)

OTHER PUBLICATIONS

AQUA-STEP; Promotional Website, Internet, Allegedly Nov. 24, 2009.

*Primary Examiner* — Chi Q Nguyen
(74) *Attorney, Agent, or Firm* — Miller & Martin PLLC

(57) ABSTRACT

Waterproof engineered floor and wall planks have a veneer layer bonded with a plastic composite core, and an underlayer, preferably an underlayer of cork.

17 Claims, 4 Drawing Sheets

Related U.S. Application Data continuation of application No. 16/947,992, filed on Aug. 27, 2020, now Pat. No. 11,486,149, which is a continuation of application No. 16/037,939, filed on Jul. 17, 2018, now Pat. No. 10,787,822, which is a continuation of application No. 14/980,235, filed on Dec. 28, 2015, now Pat. No. 10,024,066, which is a continuation of application No. 14/816,181, filed on Aug. 3, 2015, now Pat. No. 9,234,357, which is a continuation of application No. 13/657,750, filed on Oct. 22, 2012, now Pat. No. 9,156,233.

(51) Int. Cl.
| | |
|---|---|
| *B32B 3/06* | (2006.01) |
| *B32B 3/26* | (2006.01) |
| *B32B 3/30* | (2006.01) |
| *B32B 5/18* | (2006.01) |
| *B32B 7/12* | (2006.01) |
| *B32B 9/00* | (2006.01) |
| *B32B 9/02* | (2006.01) |
| *B32B 21/04* | (2006.01) |
| *B32B 21/08* | (2006.01) |
| *B32B 21/12* | (2006.01) |
| *B32B 21/14* | (2006.01) |
| *B32B 25/04* | (2006.01) |
| *B32B 25/08* | (2006.01) |
| *B32B 27/06* | (2006.01) |
| *B32B 27/08* | (2006.01) |
| *B32B 27/20* | (2006.01) |
| *B32B 27/30* | (2006.01) |
| *B32B 27/32* | (2006.01) |
| *B32B 29/00* | (2006.01) |
| *E04C 2/12* | (2006.01) |
| *E04C 2/20* | (2006.01) |
| *E04C 2/24* | (2006.01) |
| *E04C 2/28* | (2006.01) |
| *E04C 2/40* | (2006.01) |
| *E04F 15/02* | (2006.01) |
| *E04F 15/04* | (2006.01) |
| *E04F 15/10* | (2006.01) |
| *B32B 23/04* | (2006.01) |
| *B32B 23/08* | (2006.01) |
| *E04C 2/38* | (2006.01) |

(52) U.S. Cl.
CPC .............. *B32B 3/30* (2013.01); *B32B 5/18* (2013.01); *B32B 7/12* (2013.01); *B32B 9/002* (2013.01); *B32B 9/02* (2013.01); *B32B 21/04* (2013.01); *B32B 21/08* (2013.01); *B32B 21/12* (2013.01); *B32B 21/14* (2013.01); *B32B 25/04* (2013.01); *B32B 25/08* (2013.01); *B32B 27/06* (2013.01); *B32B 27/08* (2013.01); *B32B 27/20* (2013.01); *B32B 27/304* (2013.01); *B32B 27/32* (2013.01); *B32B 29/00* (2013.01); *E04C 2/12* (2013.01); *E04C 2/20* (2013.01); *E04C 2/243* (2013.01); *E04C 2/28* (2013.01); *E04C 2/40* (2013.01); *E04F 15/02038* (2013.01); *E04F 15/02183* (2013.01); *E04F 15/02188* (2013.01); *E04F 15/042* (2013.01); *E04F 15/102* (2013.01); *B32B 23/04* (2013.01); *B32B 23/08* (2013.01); *B32B 2250/02* (2013.01); *B32B 2250/03* (2013.01); *B32B 2250/04* (2013.01); *B32B 2260/021* (2013.01); *B32B 2260/046* (2013.01); *B32B 2262/065* (2013.01); *B32B 2262/067* (2013.01); *B32B 2264/04* (2013.01); *B32B 2264/065* (2013.01); *B32B 2264/067* (2013.01); *B32B 2307/536* (2013.01); *B32B 2307/554* (2013.01); *B32B 2307/7246* (2013.01); *B32B 2307/73* (2013.01); *B32B 2317/02* (2013.01); *B32B 2317/16* (2013.01); *B32B 2317/22* (2013.01); *B32B 2318/04* (2013.01); *B32B 2319/00* (2013.01); *B32B 2323/04* (2013.01); *B32B 2323/043* (2013.01); *B32B 2327/06* (2013.01); *B32B 2375/00* (2013.01); *B32B 2386/00* (2013.01); *B32B 2419/04* (2013.01); *B32B 2471/00* (2013.01); *B32B 2607/02* (2013.01); *E04C 2/246* (2013.01); *E04C 2/38* (2013.01); *E04F 2201/0146* (2013.01); *E04F 2201/023* (2013.01); *E04F 2290/00* (2013.01); *Y10T 428/239* (2015.01); *Y10T 428/24488* (2015.01); *Y10T 428/249982* (2015.04); *Y10T 428/249991* (2015.04); *Y10T 428/31551* (2015.04); *Y10T 428/31569* (2015.04); *Y10T 428/31573* (2015.04); *Y10T 428/31591* (2015.04); *Y10T 428/31598* (2015.04); *Y10T 428/31667* (2015.04); *Y10T 428/3167* (2015.04); *Y10T 428/31674* (2015.04); *Y10T 428/31833* (2015.04); *Y10T 428/31855* (2015.04); *Y10T 428/31862* (2015.04); *Y10T 428/31895* (2015.04); *Y10T 428/31902* (2015.04); *Y10T 428/31906* (2015.04); *Y10T 428/31935* (2015.04); *Y10T 428/31982* (2015.04)

(58) Field of Classification Search
CPC ...... E04F 2201/0547; E04F 2201/0153; E04F 2201/0138
See application file for complete search history.

(56) References Cited

U.S. PATENT DOCUMENTS

| | | |
|---|---|---|
| 4,724,187 A | 2/1988 | Ungar et al. |
| 6,617,009 B1 | 9/2003 | Chen et al. |
| 6,986,934 B2 | 1/2006 | Chen et al. |
| 7,155,871 B1 | 1/2007 | Stone et al. |
| 7,169,460 B1 | 1/2007 | Chen et al. |
| 7,211,310 B2 | 5/2007 | Chen et al. |
| 7,261,947 B2 | 8/2007 | Reichwein et al. |
| 7,419,717 B2 | 9/2008 | Chen et al. |
| 7,544,423 B2 | 6/2009 | Horton |
| 7,763,345 B2 | 7/2010 | Chen et al. |
| 7,770,350 B2 | 8/2010 | Moriau et al. |
| 7,866,115 B2 | 1/2011 | Pervan et al. |
| 7,877,956 B2 | 2/2011 | Martensson |
| 8,021,741 B2 | 9/2011 | Chen et al. |
| 8,099,919 B2 | 1/2012 | Garcia |
| 8,171,691 B1 | 5/2012 | Stone |
| 8,234,829 B2 | 8/2012 | Theirs et al. |
| 8,431,054 B2 | 4/2013 | Pervan et al. |
| 8,769,904 B1 | 7/2014 | Brandt et al. |
| 8,834,992 B2 | 9/2014 | Chen et al. |
| 8,875,465 B2 | 11/2014 | Martensson |
| 9,156,233 B2 | 10/2015 | Dossche et al. |
| 9,193,137 B2 | 11/2015 | Dossche et al. |
| 9,234,357 B2 | 1/2016 | Dossche et al. |
| 10,024,066 B2 | 7/2018 | Dossche et al. |
| 10,174,509 B2 * | 1/2019 | Hayes ................ B32B 3/30 |
| 10,787,822 B2 | 9/2020 | Dossche et al. |
| 11,486,149 B2 | 11/2022 | Dossche et al. |
| 11,753,832 B2 * | 9/2023 | Dossche .............. E04F 15/042 428/455 |
| 2002/0025446 A1 | 2/2002 | Chen et al. |
| 2002/0046527 A1 | 4/2002 | Nelson |
| 2003/0024199 A1 | 2/2003 | Pervan et al. |
| 2004/0016196 A1 | 1/2004 | Pervan |
| 2004/0200154 A1 | 10/2004 | Hunter, Jr. |

(56) References Cited

U.S. PATENT DOCUMENTS

| | | | |
|---|---|---|---|
| 2004/0248489 | A1 | 12/2004 | Hutchison et al. |
| 2004/0255538 | A1 | 12/2004 | Ruhdorfer |
| 2005/0003160 | A1 | 1/2005 | Chen et al. |
| 2005/0136234 | A1 | 6/2005 | Hak et al. |
| 2007/0130872 | A1 | 6/2007 | Goodwin et al. |
| 2008/0138560 | A1 | 6/2008 | Windmoller |
| 2008/0261019 | A1 | 10/2008 | Shen et al. |
| 2011/0167744 | A1 | 7/2011 | Whispell et al. |
| 2011/0247285 | A1 | 10/2011 | Wybo et al. |
| 2011/0300392 | A1 | 12/2011 | Vermeulen |
| 2012/0276348 | A1* | 11/2012 | Clausi .................. B32B 29/002 428/524 |
| 2013/0171377 | A1 | 7/2013 | Aravamudan |
| 2014/0290158 | A1 | 10/2014 | Meersseman et al. |
| 2014/0356594 | A1 | 12/2014 | Chen et al. |
| 2015/0159379 | A1 | 6/2015 | Meersseman et al. |
| 2015/0167320 | A1 | 6/2015 | Meersseman et al. |
| 2017/0217133 | A1* | 8/2017 | Jordan .................... B32B 27/34 |
| 2019/0063075 | A1* | 2/2019 | Lautzenhiser .......... B32B 21/08 |

FOREIGN PATENT DOCUMENTS

| | | |
|---|---|---|
| CN | 1482166 | 3/2004 |
| CN | 1656291 | 8/2005 |
| CN | 2765969 | 3/2006 |
| CN | 1911997 | 2/2007 |
| CN | 2880971 | 3/2007 |
| CN | 101042014 | 9/2007 |
| CN | 200720034739 | 1/2008 |
| CN | 201015944 | 2/2008 |
| CN | 2006200751872 | 2/2008 |
| CN | 101173554 | 5/2008 |
| CN | 201071580 | 5/2008 |
| CN | 100462398 | 2/2009 |
| CN | 101367977 | 2/2009 |
| CN | 101446128 | 6/2009 |
| CN | 201339298 | 11/2009 |
| CN | 101614068 | 12/2009 |
| CN | 101767362 | 7/2010 |
| CN | 201679203 | 12/2010 |
| CN | 202023326 | 12/2010 |
| CN | 101955614 | 1/2011 |
| CN | 101613503 | 5/2011 |
| CN | 101487336 | 10/2011 |
| CN | 101698749 | 10/2011 |
| CN | 102287038 | 12/2011 |
| CN | 202324521 | 7/2012 |
| CN | 201120467334 | 7/2012 |
| CN | 201120467683 | 7/2012 |
| CN | 202483139 | 10/2012 |
| CN | 102933385 | 2/2013 |
| EP | 2202056 | 6/2010 |
| EP | 2569151 | 3/2013 |
| GB | 518239 | 2/1940 |
| KR | 20127030803 | 4/2011 |
| RU | 2081135 | 6/1997 |
| RU | 2329362 | 7/2008 |
| WO | 2006084513 | 8/2006 |
| WO | 2010081860 | 7/2010 |
| WO | 2011141849 | 11/2011 |
| WO | 2012061300 | 5/2012 |

* cited by examiner

ENGINEERED WATERPROOF PLASTIC COMPOSITE FLOORING AND WALL COVERING PLANKS

CLAIM OF PRIORITY

The present application is a continuation of and also claims priority to U.S. application Ser. No. 17/947,475, filed on Sep. 19, 2022, now U.S. Pat. No. 11,753,832 issued Sep. 12, 2023, which is a continuation of U.S. application Ser. No. 16/947,992, now U.S. Pat. No. 11,486,149 issued Nov. 1, 2022, filed on Aug. 27, 2020, which is a continuation of U.S. application Ser. No. 16/037,939, filed on Jul. 17, 2018, now U.S. Pat. No. 10,787,822 issued Sep. 29, 2020, which is a continuation of U.S. application Ser. No. 14/980,235, filed on Dec. 28, 2015, now U.S. Pat. No. 10,024,066 issued Jul. 17, 2018, which is a continuation of U.S. application Ser. No. 14/816,181, filed Aug. 3, 2015, now U.S. Pat. No. 9,234,357 issued Jan. 12, 2016, which is a continuation of U.S. application Ser. No. 13/657,750, filed Oct. 22, 2012, now U.S. Pat. No. 9,156,233 issued Oct. 13, 2015.

FIELD OF THE INVENTION

This invention relates to flooring, and particularly a new and improved waterproof flooring utilizing bamboo and plastic.

BACKGROUND OF THE INVENTION

In the flooring industry, there is a significant need for waterproof flooring that presents the appearance of a wooden floor. In particular, this flooring needs to be not only resistant to moisture, but also economical, easy to install, easy to maintain, and comfortable to walk on.

In the flooring industry, laminate flooring using fiberboard or particle board as the core layer has gained a tremendous market share. Such laminate flooring is manufactured with numerous desirable properties such as reasonable cost, stain resistance, wear resistance, easy maintenance, and fire resistance. In addition, laminate flooring is able to carry many types of printed designs, including wood grain designs.

Natural wood floors, particularly of oak and other hardwoods have been employed as flooring materials for centuries. While not as economical as laminate flooring, the appearance and comfort of wooden flooring is highly desirable. One of the most significant drawbacks to both laminate and wooden flooring is their performance when subjected to sustained exposure to moisture. In the case of wooden floors, moisture will cause swelling and warping of the flooring leading to an uneven surface and even gaps between the planks. In the case of laminate flooring, sustained exposure to moisture will frequently destabilize the integrity of the fiberboard or particle board material causing permanent and irreparable damage to the laminate boards. This leads many flooring installers to avoid the use of laminate flooring in areas that are subject to repeated or sustained moisture such as in the kitchen, bathroom, laundry room and basement areas of a house or in the commercial settings of restaurants and some retail stores.

As a result of the shortcomings of wood and laminate flooring, the choices for flooring in wet areas have traditionally been limited to ceramic tile, stone, and rubber or vinyl flooring. With ceramic tile and stone, the visual choices are limited, the cost of materials and installation is relatively high, and the resulting floors are cold in the absence of subsurface radiant heating and hard to stand on for extended periods of time. Rubber and vinyl floors can be relatively inexpensive, however, because these flooring materials are not rigid, imperfections from the subfloor transfers through the rubber or vinyl and appears on the floor surface which can be aesthetically jarring. In addition, the strength of adhesives used with rubber and vinyl floors can be compromised by moisture that can result in curling damage since the floors lack rigidity.

To address these issues, laminate flooring has been manufactured with improved moisture resistance through the selection of melamine, isocyanate or phenolic binders and through application of waterproofing materials and silicone caulking to seal voids. These steps remain inadequate however, both due to added time of installation and cost of manufacture, and because these waterproofing attempts are not 100% effective. One attempt to produce a suitable laminate plank is described in U.S. Pat. No. 7,763,345, and its related applications, where a thermoplastic material core is created and a print layer and a protective overlay are applied to the top side. The thermoplastic material core is typically a rigid polyvinylchloride compound and the core is extruded with cavities to provide cushioning. Extruded planks have a tendency to cup, however, and even with cavities, the PVC thermoplastic core is not inexpensive.

In modern construction it is also desirable to utilize green or recycled materials to minimize the environmental cost of construction. As a result, it is desirable to maximize the use of recycled or waste materials whenever possible. Therefore, a need exists for improved waterproof engineered flooring and wall covering material.

SUMMARY OF THE INVENTION

A feature of the present invention is to provide a rigid waterproof flooring or wall covering plank that includes the possibility of a wide variety of visual surface appearances, a rigid and relatively environmentally friendly core, and an optional cushioned backing. The engineered planks according to the invention may advantageously utilize a locking system so that the flooring can be snapped together as a floating floor, employing the floating floor installation method where no adhesive is required to bond the flooring planks to the subfloor. In addition, a portion of the engineered waterproof plank materials can comprise bamboo dust, wood dust or cork dust that is substantially a byproduct of other flooring manufacturing processes.

By combining the bamboo, wood or cork dust, or combination thereof, with high density polyethylene (HDPE), or polyvinylchloride (virgin, recycled, or a mixture thereof), a rigid and inert core is provided that does not absorb moisture and does not expand or contract, thereby eliminating the formation of peaks and gaps.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PRESENT INVENTION

Figure 1:
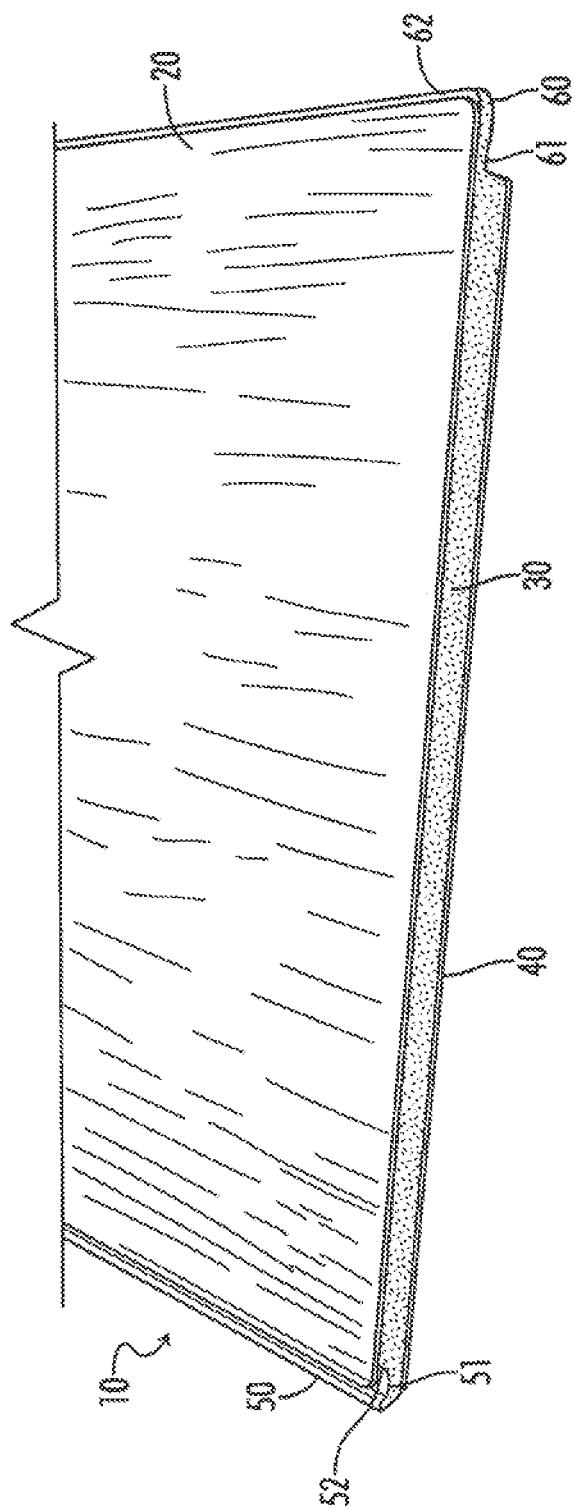
FIG. 1 is a perspective view of an exemplary engineered waterproof flooring plank according to the invention.

In general, the present invention relates to a waterproof engineered flooring plank or wall panel. The end view of the exemplary flooring plank 10 shown in FIG. 1 shows the three principal structural components of the plank. Specifically, the top surface is a veneer layer, such as wear layer 20, that is waterproof and is selected from a number of possible materials including: tile or stone veneers; rubber; decorative plastic; decorative vinyl; linoleum; and any material (such as cork, bamboo or wood veneer) encapsulated in vinyl or resin to render the layer waterproof and wear resistant. A decorative vinyl wear layer is particularly cost and performance effective. This surface is not only resistant to moisture, but can also be provided with a static coefficient of friction (CoF) of about 0.68 according to ASTM C 1028-96, and a CoF of at least about 0.60 is desirable for most applications.

The middle section or core 30 of the engineered plank 10 is a composite material formed from raw or unprocessed bamboo dust, wood dust, cork dust or a mixture thereof and high density polyethylene (HDPE) or alternatively, virgin or recycled PVC or a combination of such PVCs, and up to about 10% chemical additives such as anti-UV agents, anti-oxidation agents, stabilizers, colorants, anti-fungus agents, coupling agents, reinforcing agents, and lubricants. Calcium carbonate may also be added as a filler. After blending and melting the dust and HDPE or PVC, and additives and filler, the composite material is extruded to desired dimension. This type of HDPE and dust composite has previously been manufactured primarily for use as outdoor decks, railings and fences, but heretofore has not been used in a fashion that was sufficiently visually appealing or commercially viable for residential or commercial flooring. Instead, these wood-plastic or bamboo-plastic composites have been impregnated with colors according to a limited color pallet suitable and only promoted for exterior use. When used in the present invention, some additives, such as anti-UV agents, anti-fungals, and insecticides, are not needed. Also, heretofore, cork dust has not been a principal ingredient of the plastic composites. Whereas generally the addition of greater amounts of wood or bamboo dust provided greater rigidity to the resulting planks, cork dust retains some resilience even in the plastic mixture. The core 30 can be solid, or can be provided with channels or cavaties if desired, particularly in relatively thick embodiments.

The underlayment layer 40 is attached to the extruded dust and plastic core 30 and is also made of waterproof or water resistant material such as cork, rubber, foam or waterproof balancing paper.

The plank 10 also has a grooved end 50 with profile 51 and channel 52 that matches with protruding end 60 having profile 61 and protrusion 62. The particular profiles are made according to a preferred design to allow the panels to be quickly locked together, typically without the use of adhesive. However, if desired, an adhesive may be applied to the profiles therefore joining planks together to create a more permanent bonding of adjacent planks. The matching profiles may be of the click-lock variety depicted in FIGS. 3a-d or a more traditional tongue and groove construction that generally requires the use of an adhesive.

Figure 2:
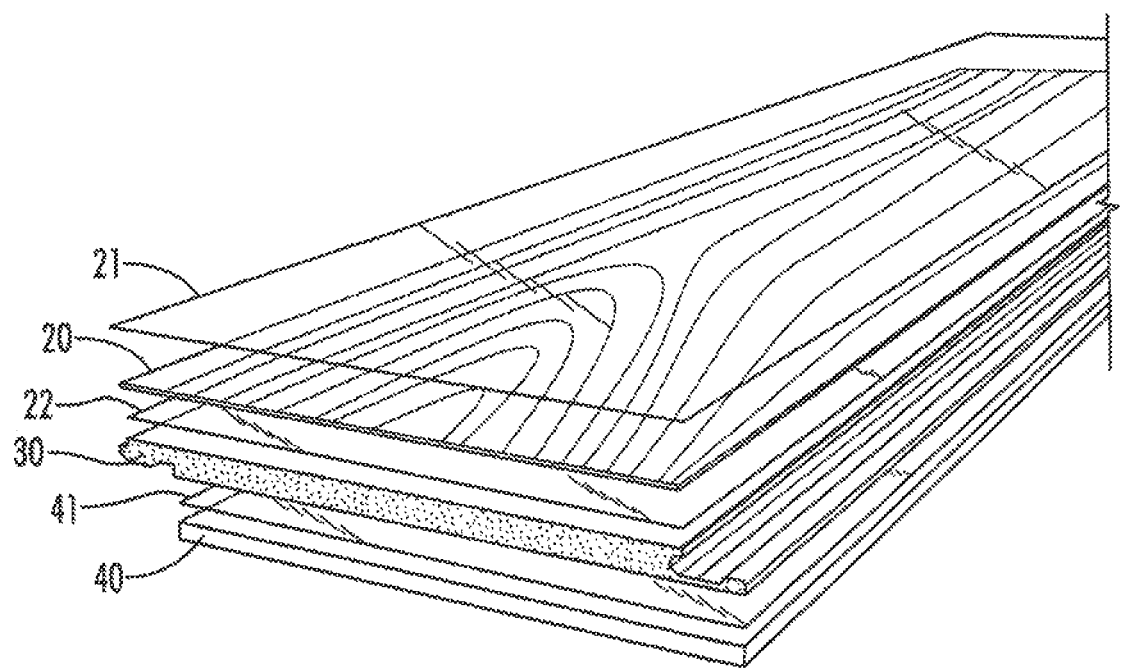
FIG. 2 is an exploded sectional view of an exemplary flooring plank according to the invention.

FIG. 2 is an exploded view of the various layers that may be included in a plank or wall panel of the invention. The top layer 21 is an optional protective overlay or cover layer that is most desirable when the wear layer 20 is not particularly durable. Preferred top layer characteristics include transparency, hardness and scratch resistance. Exemplary materials for a top layer 21 include melamine resin with aluminum oxide and polyurethane. Wear layer 20 is less likely to benefit from a top layer 21 when comprised of a durable material such as tile or stone, or when the wear layer 20 already includes a protective hardener such as is the case with resin or vinyl encapsulated bamboo, wood or cork.

A bonding layer 22 joins the wear layer 20 to the core 30 and is typically, though not exclusively, a water resistant adhesive. A preferred adhesive type is a hot melt adhesive that can be applied during the manufacture of the engineered flooring or wall covering, at temperatures over 200° F., and more commonly over 250° F., and is therefore not suitable for convenient use at a residence or commercial establishment when flooring is being installed. The hot melt adhesive should be water resistant or nearly impervious to significant and prolonged exposure to moisture.

Another bonding layer 41 joins the underlayment layer 40 to the core 30. As with the first bonding layer 22, this second bonding layer 41 is also preferably a hot melt adhesive that is nearly impervious to moisture. The underlayment layer 40 is selected from a variety of possible materials depending upon the price point and functionality of the flooring or wall covering planks.

Figure 3A:
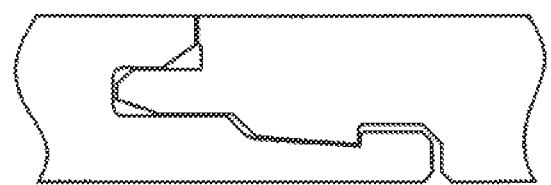
FIGS. 3a-d depict exemplary prior art click-lock edge configurations that may be advantageously used with various planks made according to the invention.
Figure 3B:
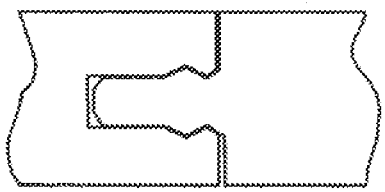
Figure 3C:
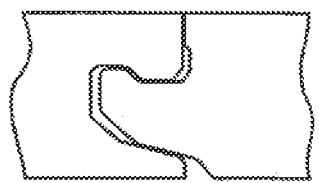
Figure 3D:
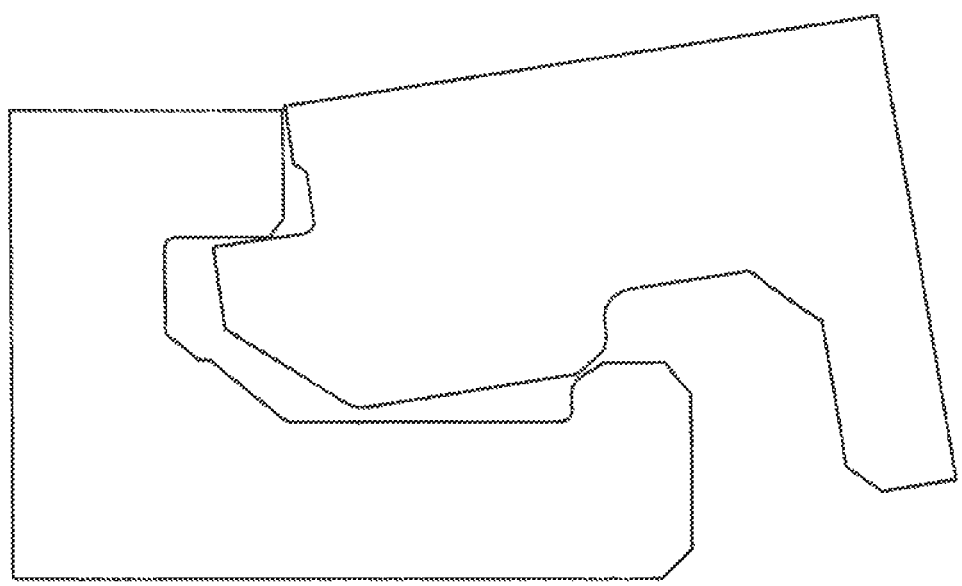

Planks according to the present invention are advantageously provided with click-lock edge systems, such as the protrusion 62 that co-operates with channel 52 and edge profiles 51, 61. Pervan, U.S. Pat. No. 6,023,907 and Morian, U.S. Pat. No. 6,006,486 disclose two of the leading edge fastening systems. FIGS. 3a-d show a variety of other click-lock edges. The system in FIG. 3a can be angled and snapped, FIG. 3b shows a snap joint, FIG. 3c can be angled and snapped but generally has less joining strength than the system of FIG. 3a. FIG. 3d also shows lock and fold panels with the first panel having a channel on the right edge being installed and the second panel being angled so that its protrusion enters the channel and the top edges of the two panels contact, and then rotating the second panel downward until the profiles are locked. When using click-lock edges, it is relatively straightforward to install floating flooring without adhesives. The particular edge system that is preferred for a particular plank may vary depending upon the dimensions and rigidity of the plank. It will also be understood that planks and panels according to the present invention can be installed using adhesives, and the adhesives can be applied to join the edges of the planks or to attach the planks to the subfloor or wall, or both.

The planks and panels according to the invention are generally rectangular having a thickness of up to about one inch (about 25.4 mm) and a width of between about 2 and 12 inches (about 50 mm to about 305 mm). In general, flooring planks will have a greater thickness than wall covering planks or panels. The use of recycled wood, cork or bamboo dust contributes to sustainability through the responsible management of resources, and provided bamboo, cork or sustainably harvested wood is used, results in an environmentally friendly building material.

The planks and panels manufactured according to the invention are nearly impervious to swelling and have great dimensional stability. These planks and panels exhibit variations due to moisture of less than 0.01%. The products can also be manufactured to tolerances of less than 0.25 mm of length, width and straightness, and many suitable wear layers provide colorfast and cleanable surfaces.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

We claim:

1. An engineered waterproof plank comprising:
   a rigid waterproof core comprising a plastic composite, wherein the plastic composite further comprises a plastic and an additive, said additive selected from a group consisting of anti-UV agents, anti-oxidation agents, stabilizers, colorants, anti-fungus agents, coupling agents, reinforcing agents, and lubricants;
   a veneer layer adhered to a top surface of the rigid waterproof core, wherein the veneer layer is selected from a group consisting of wood veneer, cork veneer, bamboo veneer, tile veneer, stone veneer, rubber veneer, decorative plastic veneer, linoleum veneer and decorative vinyl veneer; and
   a waterproof adhesive layer bonding the veneer layer to the top surface of the rigid waterproof core,
      wherein the engineered waterproof plank further comprises a locking mechanism to interlock one engineered waterproof plank to another engineered waterproof plank.

2. The engineered waterproof plank of claim 1, wherein the plastic composite comprises an extruded plastic composite.

3. The engineered waterproof plank of claim 1, wherein the plastic composite further comprises a plastic selected from a group consisting of high-density polyethylene and polyvinyl chlorides.

4. The engineered waterproof plank of claim 1, wherein the plastic composite further comprises (a) 20% to 45% of a plastic selected from a group consisting of high-density polyethylene and polyvinyl chlorides, and (b) a filler.

5. The engineered waterproof plank of claim 4, wherein the filler comprises calcium carbonate.

6. The engineered waterproof plank of claim 1, wherein the veneer layer is encapsulated in one of resin and vinyl to render the veneer layer waterproof and wear resistant.

7. An engineered plank comprising:
   a rigid inert core that is at least one of waterproof and water-resistant,
      wherein said rigid inert core comprises a plastic composite,
      wherein said plastic composite further comprises a plastic and a filler, and
      wherein said filler is calcium carbonate;
   a veneer layer disposed on a top surface of the rigid inert core,
      wherein the veneer layer is selected from a group consisting of wood, cork, bamboo, tile, stone, rubber, decorative plastic, linoleum and decorative vinyl, and
      wherein the veneer layer is bonded to the top surface of the rigid inert core via a waterproof bonding;
   a protective cover layer disposed above the veneer layer, the protective cover layer comprising one of a melamine based layer, an aluminum oxide based layer; and a polyurethane based layer; and
   the engineered plank further comprises a locking mechanism to interlock one engineered plank to another engineered plank.

8. The engineered plank of claim 7, wherein the plastic is selected from a group consisting of high-density polyethylene and polyvinyl chlorides.

9. The engineered plank of claim 7, wherein the plastic composite comprises: (a) 20% to 45% of a plastic selected from a group consisting of high-density polyethylene and polyvinyl chlorides, and (b) the filler.

10. The engineered plank of claim 7, wherein exposure to moisture results in swelling of plank dimensions by less than 0.01%.

11. The engineered plank of claim 7, wherein the engineered plank comprises one of a floor plank and a wall plank.

12. An engineered plank comprising:
   a rigid inert core that is at least one of waterproof and water-resistant,
      wherein said rigid inert core comprises a plastic composite,
      wherein said plastic composite further comprises a plastic and a filler, and
      wherein said filler is calcium carbonate;
   a top surface layer disposed on a top surface of the rigid inert core,
      wherein the top surface layer is selected from a group consisting of decorative plastic, decorative vinyl, linoleum, and rubber,
      wherein the top surface layer is bonded to the top surface of the rigid inert core via a water resistant bonding, wherein the water resistant bonding comprises a water-resistant adhesive,
      wherein the engineered plank comprises one of a floor plank for indoor use, a floor plank for outdoor decking, and a wall plank, and
      wherein the engineered plank further comprises a locking mechanism to interlock one engineered plank to another engineered plank.

13. The engineered plank of claim 12, further comprising a protective cover layer disposed above the top surface layer, wherein the protective cover layer comprises at least one of a melamine-based layer, an aluminum oxide based layer, or a polyurethane based layer.

14. The engineered plank of claim 12, wherein the plastic is selected from a group consisting of high-density polyethylene and polyvinyl chlorides.

15. The engineered plank of claim 12, wherein the plastic composite comprises: (a) 20% to 45% of a plastic selected from a group consisting of high-density polyethylene and polyvinyl chlorides, and (b) the filler.

16. The engineered plank of claim 12, further comprising an underlayer, said underlayer selected from a group consisting of cork, rubber, foam, and waterproof balance paper, wherein a waterproof adhesive layer bonds the underlayer to a bottom surface of the rigid inert core.

17. The engineered plank of claim 12, wherein exposure to moisture results in swelling of plank dimensions by less than 0.01%.

* * * * *